United States Patent
Lee et al.

(10) Patent No.: US 8,611,314 B2
(45) Date of Patent: Dec. 17, 2013

(54) DEVICE AND METHOD FOR TRANSMITTING AND RECEIVING SYNCHRONIZATION CHANNEL

(75) Inventors: Seung Joon Lee, Daejeon (KR); Choong Il Yeh, Daejeon (KR); Dong Seung Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 250 days.

(21) Appl. No.: 12/990,700

(22) PCT Filed: Mar. 20, 2009

(86) PCT No.: PCT/KR2009/001434
§ 371 (c)(1),
(2), (4) Date: Nov. 2, 2010

(87) PCT Pub. No.: WO2009/134008
PCT Pub. Date: Nov. 5, 2009

(65) Prior Publication Data
US 2011/0044301 A1    Feb. 24, 2011

(30) Foreign Application Priority Data

| May 2, 2008 | (KR) | 10-2008-0041324 |
| Jun. 11, 2008 | (KR) | 10-2008-0054652 |
| Jun. 12, 2008 | (KR) | 10-2008-0055025 |
| Dec. 11, 2008 | (KR) | 10-2008-0126101 |

(51) Int. Cl.
*H04W 4/00* (2009.01)
(52) U.S. Cl.
USPC ......... 370/336; 455/403; 455/422.1; 455/450

(58) Field of Classification Search
USPC ............... 370/310–350; 455/422.1–465
See application file for complete search history.

(56) References Cited

U.S. PATENT DOCUMENTS

| 7,969,964 B2 | 6/2011 | Kim et al. |
| 8,045,991 B2 | 10/2011 | Cho et al. |
| 2011/0044256 A1* | 2/2011 | Chang et al. ............ 370/329 |

FOREIGN PATENT DOCUMENTS

| KR | 10-2007-0077023 | 7/2007 |
| KR | 10-2007-0099483 | 10/2007 |
| KR | 10-2008-0010344 | 1/2008 |
| KR | 10-2008-0031658 | 4/2008 |
| WO | WO 2007/114638 | 10/2007 |
| WO | WO2008/013404 | 1/2008 |

OTHER PUBLICATIONS

3rd GPP; TSG-RAN; E-UTRA; Physical Channels and Modulation (Release 8), 3GPP TS 36.211, V8.2.0, Mar. 2008.
IEEE C802.16mPreamble-08/016, Proposed Text of the Preamble for the 802.16m SDD, Jun. 11, 2008.
IEEE 802.16m-08/483 and IEEE 802.16m-08/016r1: Call for Contributions on Project 802.16m System Description Document (SDD), Preambles, May 5, 2008/.

(Continued)

*Primary Examiner* — Charles C Jiang
(74) *Attorney, Agent, or Firm* — Staas & Halsey LLP (57) ABSTRACT

A method of transmitting a synchronization channel is provided. A plurality of block sequences for determining at least one block identifier is generated. A plurality of subcarriers of a synchronization channel are divided into a polarity of blocks, and the plurality of block sequences are allocated to the blocks to generate a synchronization signal.

9 Claims, 5 Drawing Sheets

(56) References Cited

OTHER PUBLICATIONS

IEEE C802.16m-08/483r1 and IEEE 802.16m-08/016r1: Call for Contributions on Project 802.16m System Description Document (SDD), Preambles, May 13, 2008.

Draft Standard for Local and metropolitan area networks—Part 16: Air Interface for Broadband Wireless Access Systems, P802.16Rev2/D2, IEEE, pp. 842-865, Dec. 2007.

International Search Report issued Jun. 26, 2009 in International Application No. PCT/KR2009/001434.

* cited by examiner

DEVICE AND METHOD FOR TRANSMITTING AND RECEIVING SYNCHRONIZATION CHANNEL

CROSS REFERENCE TO RELATED APPLICATIONS

This application claims the benefit of International Application No. PCT/KR2009/001434, filed Mar. 20, 2009, which claims the benefit of Korean Application No. 10-2008-0126101, filed Dec. 11, 2008, Korean Application No. 10-2008-0055025, filed Jun. 12, 2008, Korean Application No. 10-2008-0054652, filed Jun. 11, 2008, and Korean Application No. 10-2008-0041324, filed May 2, 2008, the disclosures of all of which are incorporated herein by reference.

TECHNICAL FIELD

The present invention relates to a synchronization channel transmitting/receiving method and device. More particularly, the present invention relates to a method and device for transmitting/receiving a synchronization channel using a synchronization sequence in a cellular system.

BACKGROUND ART

A method for acquiring synchronization by using a set of predetermined sequences is applicable to various systems, and it is representatively used for detecting a cell identifier in a wireless communication system. A receiving side takes a correlation on a received signal with a plurality of predetermined sequences to calculate a correlation value with the received signal for each sequence, and estimates a transmitted sequence based on per-sequence correlation values. However, the synchronization acquisition process is generally performed without channel estimation. Hence, the noncoherent demodulation is performed. Since the correlation value can be negative, the magnitude or the absolute value of the correlation value is used for the sequence detection process of the received signal.

A synchronization channel receiving method according to the conventional art will now be described. First, the received signal will be referred to as a vector $r=[r_0 r_1 \ldots r_{N-1}]^T$. Here, $r_n$ ($n=0, \ldots, N-1$) represents an element or entry configuring the received signal vector r, and the index n indicates a time or a subcarrier of an orthogonal frequency division multiplexing (OFDM) system. When n indicates a subcarrier, shows a received signal of the subcarrier n. N corresponding to the length of vector r indicates the length of the synchronization sequence.

A set of a predetermined sequences is called $c^{(k)}=[c_0^{(k)} c_1^{(k)} \ldots c_{N-1}^{(k)}]^T$ ($k=0, \ldots, K-1$).

Here, K represents a number of sequences in the sequence set.

The square value $D^{(k)}$ of the correlation value of the received signal r and the sequence k is given as Equation 1.

$$D^{(k)} = \left| \sum_{n=0}^{N-1} c_n^{(k)} r_n^* \right|^2 \quad \text{(Equation 1)}$$

Here, $|\bigcirc|$ represents the magnitude of the complex number, and $r_n^*$ indicates a complex conjugate of $r_n$.

A sequence transmitted by a transmitter is called $[c_0^{(m)} c_1^{(m)} \ldots c_{N-1}^{(m)}]$, and each element or entry of the transmitted sequence is referred to as a chip. When a channel gain between a transmitting side and a receiving side undergone by $c_n^{(m)}$ is set to be $a_n$, a relation between a transmitted signal and a received signal is expressed as Equation 2.

$$r_n = a_n c_n^{(m)} + w_n \quad \text{(Equation 2)}$$

Here, $w_n$ is additive white Gaussian noise (AWGN). Equation 3 is acquired by ignoring AWGN ($w_n=0$) and substituting Equation 2 for Equation 1.

$$D^{(k)} = \left| \sum_{n=0}^{N-1} a_n c_n^{(m)} (c_n^{(k)})^* \right|^2 \quad \text{(Equation 3)}$$

In general, $c^{(k)}$ ($k=0, \ldots, K-1$) is set so that the cross-correlation value between the sequences may be small, that is, it may satisfy Equation 4. If $a_n$ is rarely variable by n, $D^{(k)}$ can be approximated as Equation 5. Therefore, $D^{(k)}$ has a relatively large value when $k \neq m$ and $D^{(k)}$ has a relatively large value when $k=m$, so that the transmitted sequence can be estimated by the receiving side.

$$\left| \sum_{n=0}^{N-1} c_n^{(k_1)} (c_n^{(k_1)})^* \right| \to 0, \quad k_1 \neq k_2 \quad \text{(Equation 4)}$$

$$D^{(k)} \approx |a_n|^2 \left| \sum_{n=0}^{N-1} c_n^{(m)} (c_n^{(k)})^* \right|^2 \quad \text{(Equation 5)}$$

However, if $a_n$ is changed greatly according to n, $D^{(k)}$ can be substantially increased in the case of $k \neq m$ and $D^{(k)}$ can be frequently decreased in the case of $k=m$, and hence the sequence detected by the receiver according to the conventional synchronization channel receiving method may further generate a sequence that is different from that transmitted by the transmitter. That is, when n represents a subcarrier, N is great, and the channel has great frequency selectivity in the OFDM system, so the conventional art increases transmission sequence detecting error probability.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a synchronization channel transmitting/receiving method for reducing a transmission signal detecting error when the frequency selectivity of a synchronization channel is heavy.

Technical Solution

An embodiment of the present invention provides a method of transmitting a synchronization channel. The method includes generating a plurality of block sequences for determining at least one block identifier, dividing a plurality of subcarriers of a synchronization channel into a plurality of blocks, and allocating the plurality of block sequences to the plurality of blocks to generate a synchronization signal.

Another embodiment of the present invention provides a method of receiving a synchronization channel. The method includes estimating a plurality of block identifiers by using a received signal, and estimating an identifier by combining the block identifiers. A plurality of subcarriers of a synchronization channel in the received signal are divided into a plurality of blocks, and block sequences are allocated to the plurality of blocks.

According to an embodiment of the present invention, since the synchronization sequence is configured with a set of short block sequences and the same block identifier information is repeatedly transmitted, it is possible to improve identifier estimation performance in the channel environment with heavy selectivity.

MODE FOR THE INVENTION

In the following detailed description, only certain embodiments of the present invention have been shown and described, simply by way of illustration. As those skilled in the art would realize, the described embodiments may be modified in various different ways, all without departing from the spirit or scope of the present invention. To clarify the present invention, parts that are not related to descriptions are omitted, and the same parts throughout the specification have the same drawing sequence in the drawings.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

A synchronization channel transmitting device according to an embodiment of the present invention will now be described with reference to FIG. 1.

Figure 1:
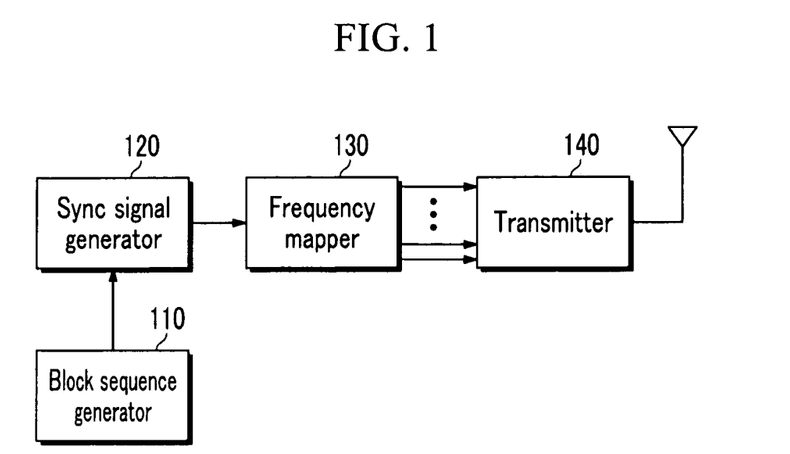
FIG. 1 shows a block diagram of a synchronization channel transmitting device according to an embodiment of the present invention.

FIG. 1 shows a block diagram of a synchronization channel transmitting device according to an embodiment of the present invention.

Referring to FIG. 1, the synchronization channel transmitting device includes a block sequence generator 110, a synchronization signal generator 120, a frequency mapper 130, and a transmitter 140.

The block sequence generator 110 generates a plurality of block sequences and transmits the same to the synchronization signal generator 120.

The synchronization signal generator 120 generates a synchronization signal by using the plurality of block sequences provided by the block sequence generator 110. The synchronization signal generator 120 divides a plurality of subcarriers of the synchronization channel into a plurality of blocks, and allocates each of the block sequences to a corresponding one of the blocks to generate a synchronization signal.

The frequency mapper 130 maps the synchronization signal generated by the synchronization signal generator 120 and transmission data on the time domain and the frequency domain to generate a downlink frame.

The transmitter 140 receives the downlink frame from the frequency mapper 130 and transmits it through the transmit antenna.

A synchronization channel transmitting method according to an embodiment of the present invention will now be described with reference to FIG. 2 to FIG. 4.

Figure 2:
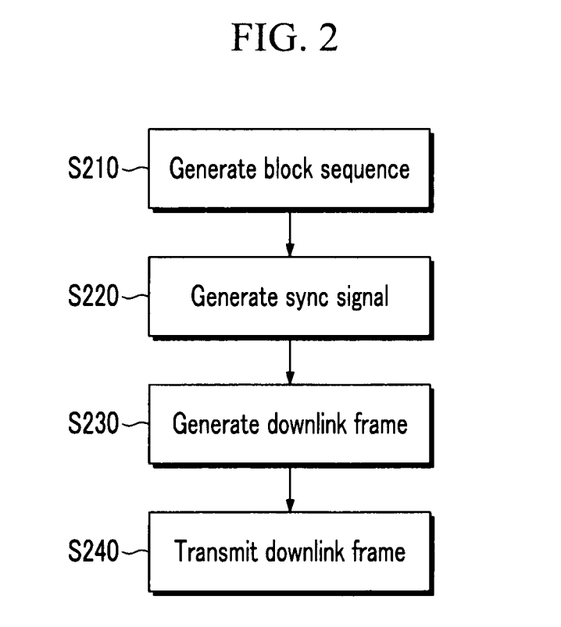
FIG. 2 a flowchart of a synchronization channel transmitting method according to an embodiment of the present invention.
Figure 3:
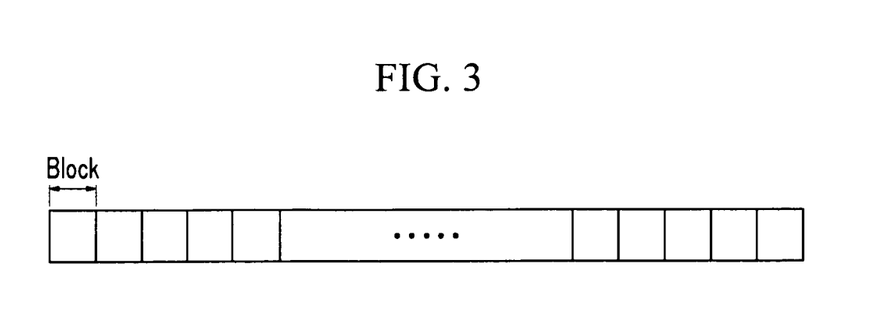
FIG. 3 shows a drawing of dividing a plurality of subcarriers of a synchronization channel into a plurality of blocks.

FIG. 2 a flowchart of a synchronization channel transmitting method according to an embodiment of the present invention, and FIG. 3 shows a drawing of dividing a plurality of subcarriers of a synchronization channel into a plurality of blocks.

Referring to FIG. 2, the block sequence generator 110 generates a plurality of block sequences and transmits them to the synchronization signal generator 120 (S210).

In the synchronization channel transmitting method according to the embodiment of the present invention, as shown in FIG. 3, a plurality of subcarriers of the synchronization channel are divided into a plurality of blocks and sequences are allocated to the blocks, respectively. The lengths of the plurality of blocks can be the same or different.

The sequence allocated to the entire subcarriers of the synchronization channel will be referred to as an entire sequence, and the sequence allocated to the block will be called a block sequence. That is, a plurality of block sequences form one entire sequence.

The entire sequence determines an identifier, and the block sequence determines a block identifier. Here, the identifier will be denoted as ID, and the block identifier will be written as SUB_ID. That is, the plurality of block sequences determine a plurality of block identifiers SUB_IDs, and the plurality of block identifiers SUB_IDs determine the identifier ID.

The synchronization signal generator 120 allocates the plurality of block sequences provided by the block sequence generator 110 to the subcarriers of the synchronization channel to generate a synchronization signal (S220).

A method for generating the synchronization signal will now be described with reference to FIG. 4.

Figure 4:
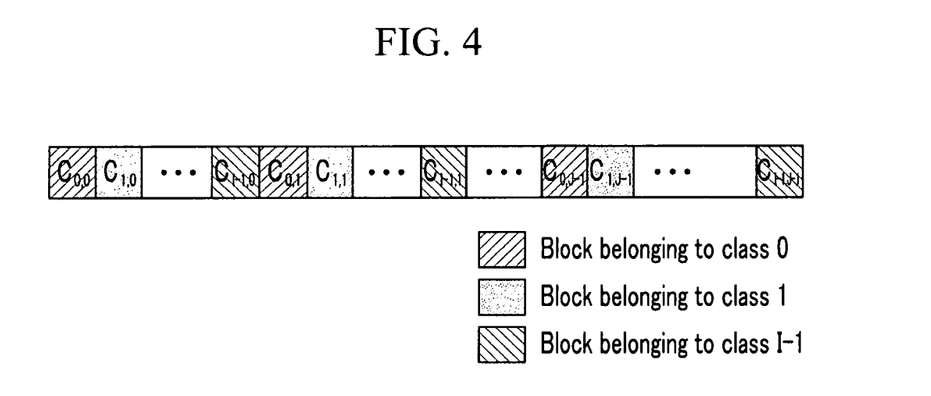
FIG. 4 shows a synchronization signal generated by allocating a plurality of block sequences.

FIG. 4 shows a synchronization signal generated by allocating a plurality of block sequences.

Referring to FIG. 4, the synchronization signal generator 120 divides a plurality of subcarriers of the synchronization channel into a plurality of blocks, and divides a plurality of blocks into a plurality of classes, for example I classes. A block sequence for determining the same block identifier is allocated to the blocks belonging to the same class. That is, a block sequence for determining block identifier $SUB\_ID^{(i)}$ is allocated to the blocks belonging to the class i.

In FIG. 4, indicates the sequence allocated to the j-th block from among the blocks belonging to the class $c_{i,j}$. The same block sequence or different block sequences may be allocated to the blocks belonging to the same class. For example, $c_{0,0}$ and $c_{0,1}$ may be different or the same. However, the block identifier determined by $c_{0,0}$ and the block identifier determined by $c_{0,1}$ are the same $SUB\_ID^0$.

One identifier ID is determined by combination of a plurality of block identifiers determined by a plurality of block sequences. In FIG. 4, the identifier ID is determined to be $(SUB\_ID^0, SUB\_ID^1, \ldots, SUB\_ID^{I-1}$ by $SUB\_ID^{(i)}$(i=0, 1, \ldots, I-1).

In comparison with two identifiers, if at least one part of the block identifiers is different, the two identifiers are different. That is, when there are a first identifier $(SUB\_ID_1^0, SUB\_ID_1^1, \ldots, SUB\_ID_1^{(i)}, \ldots, SUB\_ID_1^{I-1})$ and a second identifier $(SUB\_ID_2^0, SUB\_ID_2^2, \ldots SUB\_ID_2^{(i)}, \ldots, SUB\_ID_2^{I-1})$, when it is satisfied that $SUB\_ID_1^{(i)} \ne SUB\_ID_2^{(i)}$ for at least one i, the first identifier is different from the second identifier.

The receiving device detects block identifiers for respective classes, and combines the block identifiers to detect the identifier. In this case, all the blocks belonging to the same class are used to detect the block identifier. Therefore, when the number of classes and the length of the block are constant and the number of blocks belonging to the same class is increased, the number of times of transmitting the same information (i.e., the same block identifier) is increased. Accordingly, block identifier detection performance can be improved.

When the number of block identifiers for each class is constant and the number of classes is increased, the maximum number of identifiers is increased. The number of block identifiers for each class represents the number of block identifiers that are distinguishable as one block sequence. For example, when the number of block identifiers for each class is 8, the maximum number of identifiers is 64 if the number of classes is 2, and it is 512 when the number of classes is 3.

When generating the synchronization signal, the synchronization signal generator 120 can scramble the entire sequence configured with a plurality of block sequences with a scrambling sequence so as to reduce the peak to average power ratio (PAPR).

When the entire sequence configured with combination of a plurality of block sequences is given as $[q_0^{(m)} q_1^{(m)} \ldots q_{N-1}^{(m)}]^T$ (where N is the length of the entire sequence, and m is an identifier determined by the entire sequence) and a scrambling sequence is given as $[s_0 s_1 \ldots s_{N-1}]^T$, the scrambled entire sequence is expressed as Equation 6.

$$[q_0^{(m)} s_0 q_1^{(m)} s_1 \ldots q_{N-1}^{(m)} s_{N-1}]_T \quad \text{(Equation 6)}$$

Respective elements $s_n$(n=0, \ldots, N-1) of the scrambling sequence are a complex number with a magnitude of 1.

When the number of identifiers is M, PAPR values generated by the entire scrambled sequences of Equation 6 for the respective M identifiers are found to minimize the average of the RAPR values for the M identifiers or set the phase value of the scrambling sequence so that the maximum value of the RAPR values for the M identifiers may be minimized.

Referring to FIG. 2 again, the frequency mapper 130 maps the synchronization signal generated by the synchronization signal generator 120 and the transmission data on the time and frequency domains to generate a downlink frame (S230).

The transmitter 140 receives the downlink frame from the frequency mapper 130 and transmits it through the transmit antenna (S240).

In this case, synchronization channel performance can be increased by using multi-transmit antennas.

A synchronization signal transmitting method using multiple transmit antennas according to an embodiment of the present invention will now be described in detail with reference to FIG. 5 to FIG. 8. The synchronization signal transmitting method includes 3 kinds of methods.

Figure 5:
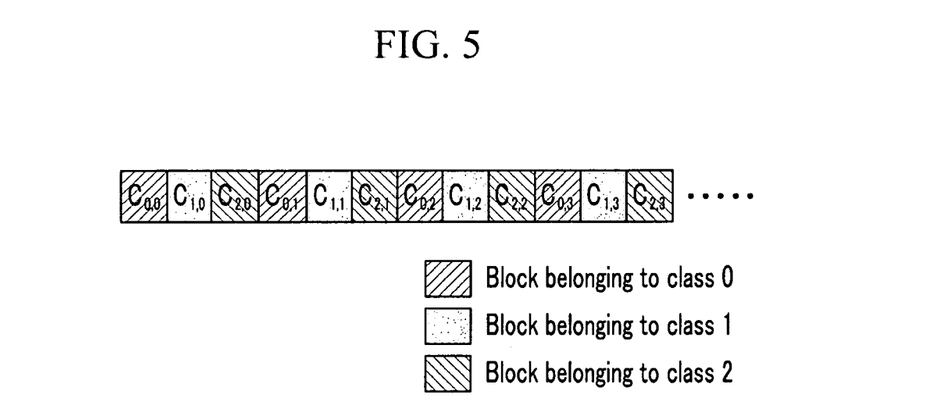
FIG. 5 shows a synchronization signal when the number of classes is given as 3.
Figure 6:
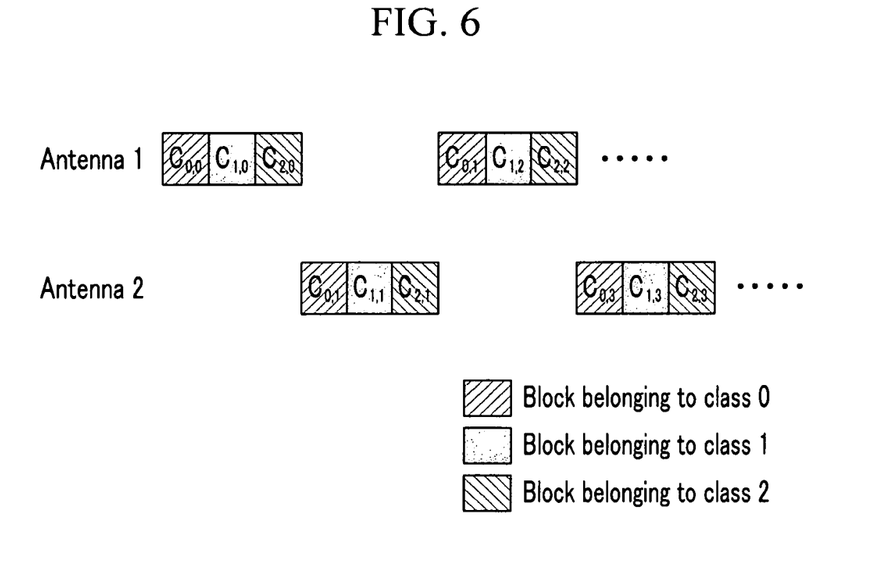
FIG. 6 to FIG. 8 show a method for transmitting a synchronization signal of FIG. 5 through two transmit antennas.
Figure 7:
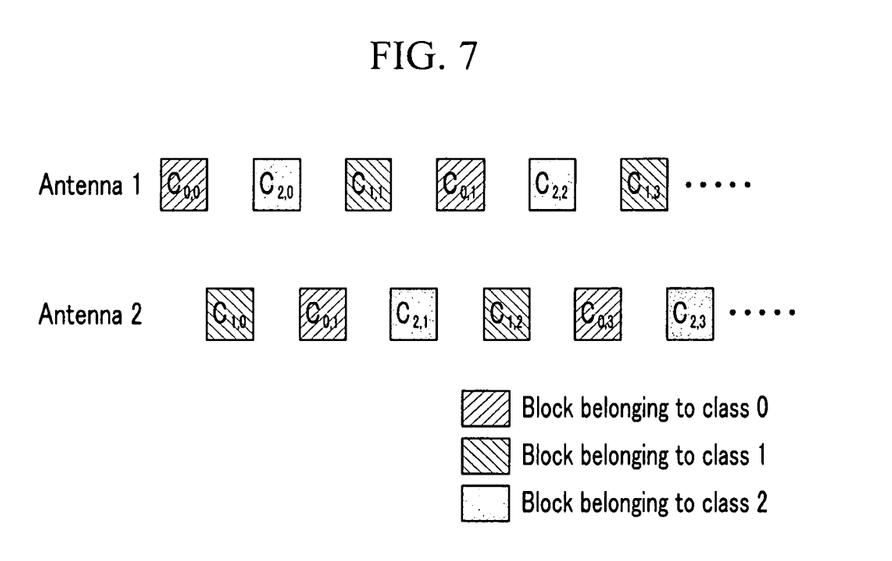
Figure 8:
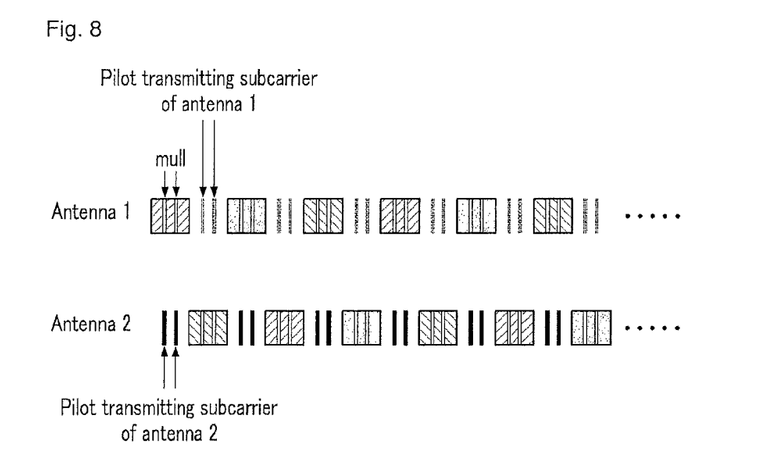

FIG. 5 shows a synchronization signal when the number of classes is given as 3. FIG. 6 shows a first method for transmitting a synchronization signal of FIG. 5 through two transmit antennas, FIG. 7 shows a second method for transmitting a synchronization signal of FIG. 5 through two transmit antennas, and FIG. 8 shows a third method for transmitting a synchronization signal of FIG. 5 through two transmit antennas. In the embodiment of the present invention, the case in which the number of the classes is 3 and the number of transmit antennas is 2 will be described, but is not limited thereto.

Referring to FIG. 6 and FIG. 7, according to the first method and the second method for transmitting the synchronization signal through two transmit antennas, one block is transmitted through the same antenna, and different blocks belonging to the same class are transmitted alternately through the two transmit antennas. When one transmit antenna transmits a block, another transmit antenna may not transmit a signal in the block section (i.e., frequency domain).

In order to reduce the PAPR values of the respective transmit antennas, the locations of the blocks transmitted by the transmit antennas can be uniformly scattered. That is, the PAPR values for the transmit antennas can be reduced by allocating the blocks as shown in FIG. 7.

Referring to FIG. 8, according to the third method for transmitting the synchronization signal through two transmit antennas, different blocks belonging to the same class are alternately allocated to two transmit antennas, part of the subcarriers of the block allocated to an antenna 1 of the two transmit antennas are used for transmitting a pilot signal of an antenna 2 of the two transmit antennas, and part of the subcarriers of the block allocated to the antenna 2 are used for transmitting a pilot signal of the antenna 1.

The process for a terminal to detect the identifier of the synchronization signal by using the received signal can use the synchronization signal as a pilot signal for channel estimation while the process is performed with the noncoherent method without estimating the channel.

The transmit antenna cannot directly measure the channel between the transmit antenna and the receive antenna for the subcarrier not transmitting a signal, and estimates the channel value by interpolating channel information on the adjacent subcarrier for directly estimating the channel. However, when the area of the subcarrier not having transmitted the pilot signal is very large, channel measurement performance caused by interpolation may be degraded.

Therefore, when part of the subcarriers of the block allocated to one antenna are used for transmitting the pilot signal of another antenna like the third method for transmitting the synchronization signal through two transmit antennas according to an embodiment of the present invention, degradation of channel measuring performance caused by interpolation can be prevented.

A synchronization channel receiving device and a synchronization channel receiving method according to an embodiment of the present invention will now be described with reference to FIG. 9 and FIG. 10.

Figure 9:
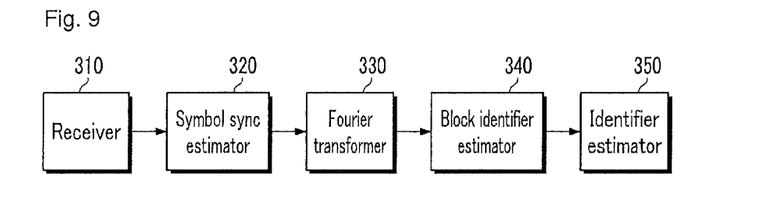
FIG. 9 shows a block diagram of a synchronization channel receiving device according to an embodiment of the present invention.

FIG. 9 shows a block diagram of a synchronization channel receiving device according to an embodiment of the present invention.

Referring to FIG. 9, the synchronization channel receiving device includes a receiver 310, a symbol synchronization estimator 320, a Fourier transformer 330, a block identifier estimator 340, and an identifier estimator 350.

The receiver 310 receives a frame from the base station, and the symbol synchronization estimator 320 uses the received signal to estimate symbol synchronization.

The Fourier transformer 330 Fourier transforms the received signal with reference to the symbol synchronization estimated by the symbol synchronization estimator 320.

The block identifier estimator 340 estimates a plurality of block sequences transmitted by the transmitting device by correlating the Fourier transformed received signal and a plurality of known block sequences, and estimates a plurality of block identifiers from the plurality of estimated block sequences.

The identifier estimator 350 estimates the identifier by combining the plurality of estimated block identifiers.

Figure 10:
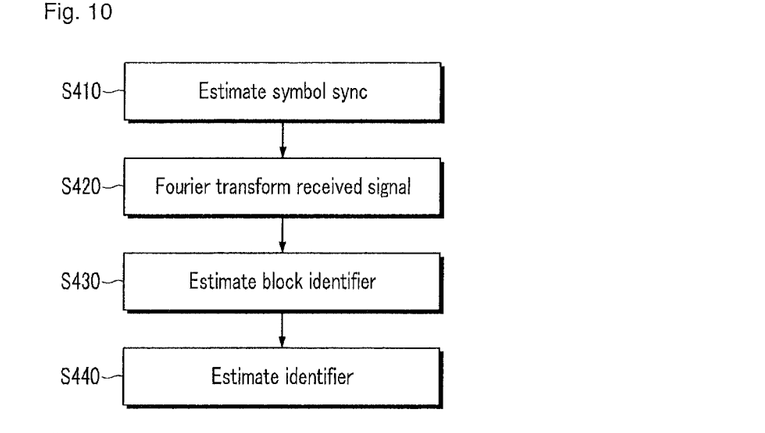
FIG. 10 shows a flowchart of a synchronization channel receiving method according to an embodiment of the present invention.

FIG. 10 shows a flowchart of a synchronization channel receiving method according to an embodiment of the present invention.

Referring to FIG. 10, the symbol synchronization estimator 320 estimates symbol synchronization by using the received signal (S410).

The Fourier transformer 330 Fourier transforms the received signal with reference to the symbol synchronization estimated by the symbol synchronization estimator 320 (S420).

The block identifier estimator 340 correlates the Fourier transformed received signal and a plurality of known block sequences to estimate a plurality of block identifiers for a plurality of block sequences transmitted by the transmitting device (S430). In this case, when the transmitting device scrambles the entire sequence with a scrambling sequence ($[s_0 s_1 \ldots s_{N-1}]^T$), the block identifier estimator 340 multiplies respective elements of the received signal by respective elements of the descrambling sequence ($[s^*_0 s^*_1 \ldots s^*_{N-1}]^T$) and detects the block identifiers by using the descrambling sequence multiplied received signal.

The receiving device knows a plurality of block sequences ($c_{i,j}^{(k)}=[c_{i,j,0}^{(k)} \ldots c_{i,j,L-1}^{(k)}]^T$)(k=0,1, . . . , $K_i$−1) that can be allocated to the j-th block of the class i. Here, k represents a block identifier, and $K_i$ indicates a block identifier of the class i. Further, J is the number of blocks belonging to the class i, and L indicates a length of the block. The length of the block is assumed to be constant in the embodiment of the present invention, and is not limited thereto.

When the transmitting device allocates $c_{i,j}^{(m)}=[c_{i,j,0}^{(m)} c_{i,j,1}^{(m)} \ldots c_{i,j,L-1}^{(m)}]^T$) to the j-th block of the class i, a received signal of the receiving device for the transmitted chip ($c_{i,j,1}^{(m)}$) is expressed in Equation 7.

$$r_{i,j,1}=a_{i,j,1}c_{i,j,1}^{(m)}+w_{i,k,1} \quad \text{(Equation 7)}$$

Here, $a_{i,j,1}$ represents a channel gain undergone by $c_{i,j,1}^{(m)}$ between the transmitting device and the receiving device, and $w_{i,j,1}$ shows AWGN.

The transmitting device finds the square ($D_{i,j}^{(m)}$) of the magnitude of the correlation value with a plurality of known block sequences for the respective block sequences transmitted through the respective blocks of the class i by using Equation 8, in order to detect the block identifier transmitted through the blocks of the class i.

$$D_{i,j}^{(k)} = \left| \sum_{l=0}^{L-1} r_{i,j,l}\left(c_{i,j,l}^{(k)}\right)^* \right|^2 \quad \text{(Equation 8)}$$

The $D_{i,j}^{(k)}$ values for the blocks belonging to the class i are added as expressed in Equation 9.

$$D_i^{(k)} = \sum_{j=0}^{J-1} D_{i,j}^{(k)} \quad \text{(Equation 9)}$$

The block identifier estimator 340 estimates the block identifier (SUB_ID$_{(i)}$) transmitted through the blocks of the class i by using $D_i^{(k)}$ of Equation 9. In this case, k with the greatest $D_i^{(k)}$ can be estimated to be the block identifier (SUB_ID$^{(i)}$).

The block identifier estimator 340 estimates the block identifiers for all the classes.

The identifier estimator 350 estimates the identifier by using the estimated block identifiers (S440). The identifier becomes (SUB_ID$^0$, SUB_ID$^1$, . . . , SUB_ID$^{J-1}$).

A method for a synchronization channel receiving device according to an embodiment of the present invention to measure a per-subband channel quality by using a received signal will now be described with reference to FIG. 11.

Figure 11:
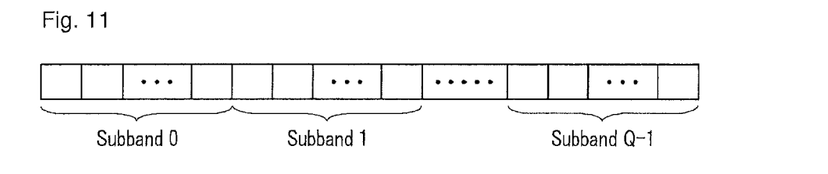
FIG. 11 shows a drawing of forming a plurality of subbands by combining a plurality of blocks of a synchronization channel with a predetermined number.

FIG. 11 shows a drawing of forming a plurality of subbands by combining a plurality of blocks of a synchronization channel with a predetermined number.

In the orthogonal frequency division multiple access (OFDMA) system, channel quality is measured for each subband so as to select the subband with good channel quality for each user. The channel quality includes the signal-to-noise ratio (SNR) and the signal to interference-and-noise ratio (SINR).

Referring to FIG. 11, a subband is formed by respectively combining N (N is an integer) adjacent blocks in the embodiment of the present invention. That is, the boundary of the subband is provided on the boundary of the block. In FIG. 11, Q represents the number of subbands. The transmitting device and the receiving device know information on the area of the subband.

The receiving device uses the blocks in the corresponding subband so as to measure the subband channel quality. The receiving device measures the channel quality in the coherent demodulation manner based on the estimated synchronization sequence information.

Performance of a synchronization channel transmitting/receiving method according to an embodiment of the present invention will now be described with reference to FIG. 12.

Figure 12:
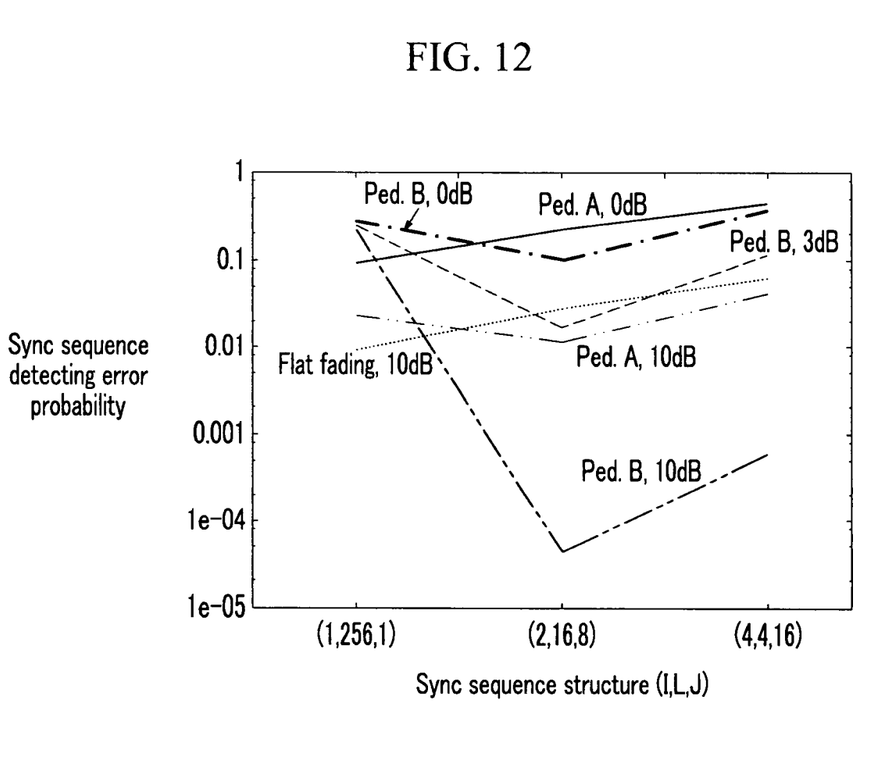
FIG. 12 shows a simulation result of a synchronization channel transmitting/receiving method according to an embodiment of the present invention.

FIG. 12 shows a simulation result of a synchronization channel transmitting/receiving method according to an embodiment of the present invention.

It is assumed in the simulation that the length of the entire sequence is 256, the interval of subcarriers is 9.765625 kHz, and the block sequence uses the Walsh sequence. The channel environment considers the flat fading channel without frequency selectivity, the Ped. A channel with a little frequency selectivity, and the Ped. B channel with severe frequency selectivity. The operational SNR considers 0 dB, 3 dB, and 10 dB.

In FIG. 12, the horizontal axis represents the three methods for transmitting/receiving a synchronization channel, and the vertical axis indicates synchronization sequence detecting error probability. In this case, I is a number of classes, L is a length of a block, and J is a number (number of times of repeatedly transmitting the same block identifier) of blocks belonging to one class.

The first method (I=1, L=256, J=1) shows the conventional method of using the entire sequence without dividing the same, the second method represents a synchronization channel transmitting/receiving method according to an embodiment of the present invention when it is set that I is 2, L is 16, and J is 8, and the third method indicates a synchronization channel transmitting/receiving method according to an embodiment of the present invention when it is set that I is 4, L is 4, and J is 16.

The three methods have the length of the entire sequence as 256. When the number of block identifiers corresponds to the length of the block sequence, the three methods have the same number (i.e., 256) of the entire identifiers (256=16*16=4*4*4*4).

Referring to FIG. 12, the conventional method of not dividing the entire sequence has the best performance in the flat fading channel environment, and the synchronization channel transmitting/receiving method for dividing the entire sequence according to the embodiment of the present invention outperforms the conventional method in the environment with frequency selectivity.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A method of transmitting a synchronization channel in a transmission system, the method comprising:
generating a plurality of transmission block sequences for determining at least one block identifier;
dividing a plurality of subcarriers of a synchronization channel into a plurality of blocks; and
allocating the plurality of block sequences to the plurality of blocks to generate a synchronization signal in the transmission system,
wherein the allocating the plurality of block sequences comprises:
dividing the plurality of blocks into a plurality of classes; and
allocating at least one block sequence for determining the same block identifier to blocks belonging to the same class.

2. The method of claim 1, wherein the allocating the at least one block sequence comprises allocating the same block sequence to the blocks belonging to the same class.

3. A method of transmitting a synchronization channel in a transmission system, the method comprising:
generating a plurality of transmission block sequences for determining at least one block identifier;
dividing a plurality of subcarriers of a synchronization channel into a plurality of blocks; and
allocating the plurality of block sequences to the plurality of blocks to generate a synchronization signal,
wherein the allocating the plurality of block sequences comprises:
dividing the plurality of blocks into a plurality of classes;
allocating at least one block sequence for determining the same block identifier to blocks belonging to the same class; and
transmitting the synchronization signal through multiple transmit antennas.

4. The method of claim 3, wherein the transmitting the synchronization signal comprises transmitting one block of the synchronization channel to the same transmit antenna, and transmitting different blocks belonging to the same class by alternately using different transmit antennas.

5. The method of claim 4, wherein part of the subcarriers of the block allocated to one of the multiple transmit antennas are used as a pilot signal for another transmit antenna.

6. A method of transmitting a synchronization channel in a transmission system, the method comprising:
generating a plurality of transmission block sequences for determining at least one block identifier; dividing a plurality of subcarriers of a synchronization channel into a plurality of blocks;
allocating the plurality of block sequences to the plurality of blocks to generate a synchronization signal in the transmission system; and
scrambling an entire sequence including the block sequences allocated to the plurality of blocks with a scrambling sequence.

7. A method of receiving a synchronization channel, the method comprising:
estimating a plurality of block identifiers by using a received signal; and
estimating an identifier by combining the block identifiers,
wherein a plurality of subcarriers of a synchronization channel in the received signal are divided into a plurality of blocks, and block sequences are allocated to the plurality of blocks.

8. A method of receiving a synchronization channel, the method comprising:
estimating a plurality of block identifiers by using a received signal; and
estimating an identifier by combining the block identifiers,
wherein a plurality of subcarriers of a synchronization channel in the received signal are divided into a plurality of blocks, and block sequences are allocated to the plurality of blocks,
wherein the estimating the plurality of block identifiers comprises estimating the block identifiers by using a correlation value of the received signal and a plurality of known block sequences.

9. A method of receiving a synchronization channel, the method comprising:
estimating a plurality of block identifiers by using a received signal;
estimating an identifier by combining the block identifiers, wherein a plurality of subcarriers of a synchronization channel in the received signal are divided into a plurality of blocks, and block sequences are allocated to the plurality of blocks; and
measuring channel quality of a subband by using the plurality of block identifiers, wherein a plurality of subcarriers of the synchronization channel are divided into a plurality of subbands, and the subbands include an integer-numbered adjacent blocks.

* * * * *